(12) United States Patent
Yanakiev

(10) Patent No.: US 7,580,786 B2
(45) Date of Patent: Aug. 25, 2009

(54) VEHICLE AND NONLINEAR CONTROL METHOD FOR VEHICLE

(75) Inventor: Diana Yanakiev, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 883 days.

(21) Appl. No.: 10/708,361

(22) Filed: Feb. 26, 2004

(65) Prior Publication Data

US 2005/0192734 A1    Sep. 1, 2005

(51) Int. Cl.
*B60T 7/12* (2006.01)
*B60T 8/32* (2006.01)
*B60K 31/04* (2006.01)

(52) U.S. Cl. ............... 701/97; 701/70; 701/93; 180/179

(58) Field of Classification Search ............... 701/93, 701/99, 1, 70, 79, 94, 97, 69; 700/19, 304, 700/37, 30, 78, 28; 180/170, 179; 327/354, 327/519, 564; 73/862.23
See application file for complete search history.

(56) References Cited

U.S. PATENT DOCUMENTS

| | | | |
|---|---|---|---|
| 4,843,553 A | 6/1989 | Ohata | |
| 5,137,104 A | 8/1992 | Etoh | |
| 5,720,533 A * | 2/1998 | Pastor et al. | 303/147 |
| 5,835,878 A * | 11/1998 | Saito et al. | 701/94 |
| 6,283,240 B1 * | 9/2001 | Beever | 180/178 |
| 6,295,500 B1 * | 9/2001 | Cullen et al. | 701/93 |
| 6,347,680 B1 * | 2/2002 | Mianzo et al. | 180/197 |
| 6,763,295 B2 * | 7/2004 | Katakura et al. | 701/70 |
| 7,050,865 B2 * | 5/2006 | Yasui et al. | 700/37 |
| 2004/0064240 A1 * | 4/2004 | Sugano | 701/93 |
| 2004/0173903 A1 * | 9/2004 | Yang et al. | 257/738 |
| 2004/0176860 A1 * | 9/2004 | Hovakimyan et al. | 700/29 |

* cited by examiner

*Primary Examiner*—Thomas G Black
*Assistant Examiner*—Christine M Behncke
(74) *Attorney, Agent, or Firm*—David B. Kelley; Brooks Kushman P.C.

(57) ABSTRACT

A method for controlling a vehicle using a nonlinear error-based control is provided. Various vehicle speed requests are arbitrated and a transfer function including an integrator is applied to the winner of the arbitration. The integrator is applied regardless of the winner of the arbitration, and it is the only integrator used in the control method. This provides an advantage over methods and systems that require resetting or switching among integrators.

23 Claims, 4 Drawing Sheets

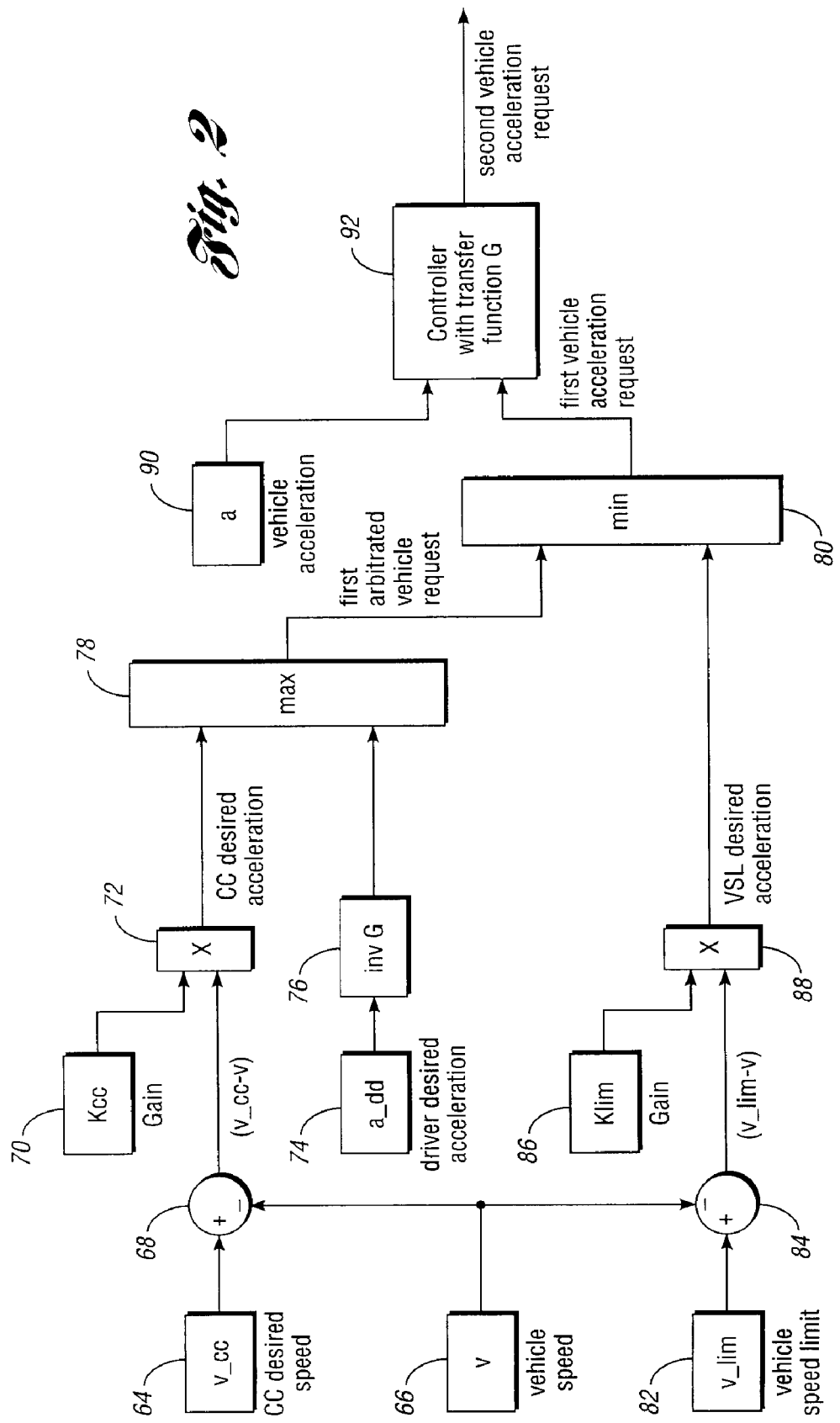

VEHICLE AND NONLINEAR CONTROL METHOD FOR VEHICLE

BACKGROUND OF INVENTION

1. Field of the Invention

The present invention relates to a vehicle and a nonlinear control method for a vehicle.

2. Background Art

The operation of a vehicle can include controlling any of a number of systems within the vehicle. For example, the speed of a vehicle may be controlled by controlling the torque output of the engine or other torque producing devices. Further, a spark-ignition (SI) engine that is equipped with electronic throttle control (ETC) has three actuators capable of modifying torque independently of driver input. These modifiers are the throttle angle, the fueling rate, and the spark timing. The engine torque response to throttle angle change may be relatively slow compared to the other two methods, mainly due to the dampening effect of the intake manifold volume.

Despite the slow response, changing the throttle angle remains an effective means for controlling the torque production of the engine, because it has a wide range of authority and does not compromise the efficiency of combustion. Conversely, the torque response to changing the fueling rate and the spark timing is much faster; however, neither of these modifiers has the range of authority of changing the throttle angle. Reducing the engine torque by changing the fueling rate in an SI engine has poor resolution. In addition, changing the spark timing can result in a lower combustion efficiency which has an adverse effect on fuel economy.

The above considerations suggest that in cases where fast response is not a primary concern, the throttle angle is the most suitable lever for engine torque control. Hence, it is the most appropriate and sufficiently fast actuator in the case of vehicle speed related functions. The vehicle speed related functions include such things as a driver initiated acceleration request, a desired speed as set in a cruise control (CC) system, and a vehicle speed limit (VSL) that is a predetermined upper speed limit for vehicle operation. Recognizing that the longitudinal motion of the vehicle is heavily influenced by nonlinear factors—e.g., aerodynamic drag—it is natural to introduce nonlinearity into the control method to address this. In addition, using a nonlinear function to control a relatively slow control lever, such as an engine throttle, can increase the response of the control lever, thereby improving vehicle control.

One method of controlling the vehicle speed with a cruise control system is described in U.S. Pat. No. 5,137,104 issued to Etoh on Aug. 11, 1992. Etoh describes determining a driving force of an engine to maintain a target vehicle speed in accordance with a nonlinear relationship between the target vehicle speed and a target variable. The Etoh method uses a conversion coefficient based on the target vehicle speed, that is chosen from a lookup table. The conversion coefficient is then applied to a vehicle speed error, which is added to a throttle angle error term, which is then applied to a drive circuit to actuate a throttle valve.

Although the conversion coefficient table is based on a nonlinear relationship between vehicle speed and throttle angle, the equation used by the drive circuit to control the throttle angle is actually linear. Moreover, the nonlinear relationship used to determine the conversion coefficient is based on a target vehicle speed, not a vehicle speed error which considers the current vehicle speed. In addition, because the conversion coefficient is taken from a table, an elaborate interpolation scheme must be used when the target vehicle speed does not exactly match a table value.

Therefore, a need exists for a vehicle and a nonlinear control method for a vehicle which improves the response of one or more vehicle system controls.

SUMMARY OF INVENTION

Accordingly, the present invention provides a vehicle and a nonlinear control method for a vehicle that improves the response of one or more vehicle system controls.

The invention also provides a nonlinear error-based control for a vehicle that responds more aggressively when a current vehicle parameter value is farther from a target value, and responds less aggressively when the current parameter value is closer to the target value.

The invention further provides a nonlinear error-based method for controlling a vehicle speed that utilizes a single integrator regardless of which vehicle speed control system is being used, thereby providing an improvement over other methods which apply an integrator in only one type of vehicle speed control system, or which use separate integrators for different speed control systems, each of which necessitates switching in and out of control modes and resetting the integrator each time the mode is switched.

The invention also provides a method for controlling a vehicle using a nonlinear error-based control. The method includes determining a current value of a first vehicle parameter, and determining a first error. The first error is the difference between a first target value of the first vehicle parameter and the current value of the first vehicle parameter. A first vehicle request is then determined; the first vehicle request is a nonlinear function of the first error.

The invention further provides a method for controlling a vehicle using a nonlinear error-based control. The method includes determining a current value of a vehicle parameter, and determining a first error. The first error is the difference between a target value of the parameter and the parameter current value. A first gain is applied to the first error thereby producing a first vehicle request. The first gain is a function of the absolute value of the first error.

The invention also provides a vehicle including a torque producing device operable to propel the vehicle. At least one sensor is configured to measure a vehicle parameter and to output signals related to the measured parameter. A controller is configured to receive signals from the at least one sensor, determine a first error, and determine a vehicle request, thereby facilitating control of the torque producing device. The first error is a difference between a target value of the vehicle parameter and a measured value of the vehicle parameter. The vehicle request is a nonlinear function of the first error.

BRIEF DESCRIPTION OF DRAWINGS

FIG. 2 is a control diagram flowchart illustrating a method of the present invention;

DETAILED DESCRIPTION

Figure 1:
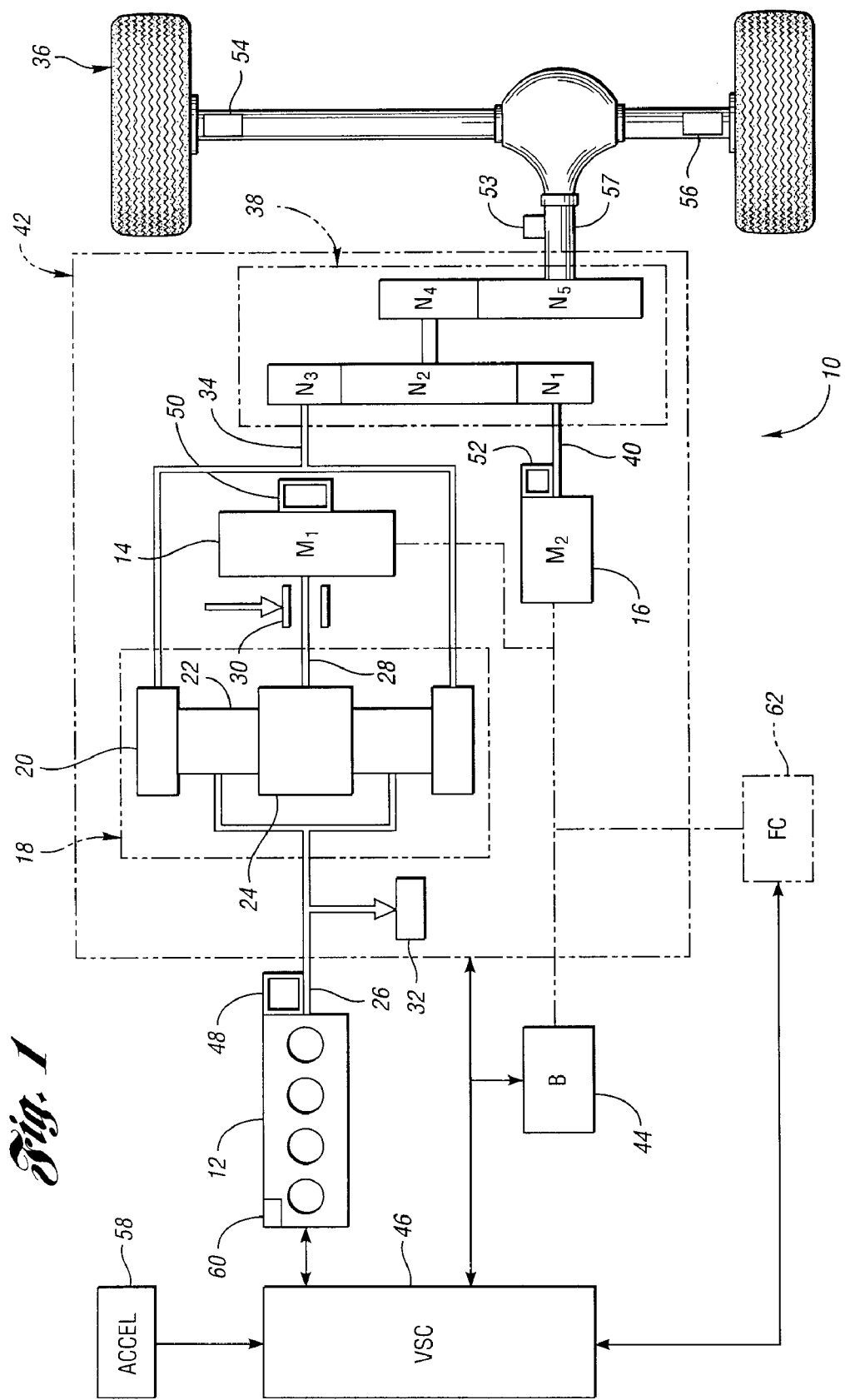
FIG. 1 is a schematic representation of a vehicle in accordance with the present invention.

FIG. 1 shows a schematic representation of a vehicle 10 in accordance with the present invention. Although the vehicle 10 is a hybrid electric vehicle (HEV), the invention encompasses other vehicle types, for example, conventional internal combustion engine vehicles, diesel engine vehicles, fuel cell vehicles and hybrid fuel cell vehicles. The vehicle 10 includes an engine 12, a first motor 14, and a second motor 16. The engine 12 and the first motor 14 are connected through a power transfer unit, which in this embodiment is a planetary gear set 18. Of course, other types of power transfer units, including other gear sets and transmissions, may be used to connect the engine 12 to the first motor 14.

The planetary gear set 18 includes a ring gear 20, a carrier 22, and a sun gear 24. An engine shaft 26 is connected to the carrier 22, while a motor shaft 28 is connected to the sun gear 24. A motor brake 30 is provided for stopping rotation of the motor shaft 28, thereby locking the sun gear 24 in place. Because this configuration allows torque to be transferred from the first motor 14 to the engine 12, a one-way clutch 32 is provided so that the engine shaft 26 rotates in only one direction.

The ring gear 20 is connected to a shaft 34, which is connected to vehicle drive wheels 36 through a second gear set 38. The second motor 16 is also connected to the wheels 36 through a second motor shaft 40 and the second gear set 38. The motors 14,16, the planetary gear set 18, and the second gear set 38 may generally be referred to as a transaxle 42.

The first and second motors 14,16 are electrically connected to a battery 44. The battery 44 provides electrical power to one or both of the first and second motors 14,16 when they output mechanical energy to the wheels 36. Alternatively, one or both of the motors 14,16 can act as a generator that can be used to charge the battery 44 when the vehicle is in a regenerative mode or when the engine is running. Moreover, either of the motors 14,16 can act as a generator to provide electrical power to the other motor.

In this embodiment, a vehicle system controller (VSC) 46 controls the engine 12 and the motors 14,16. Although shown as a single unit, the VSC 46 may be made up of more than one controller. For example, rather than the single VSC 46, the engine 12 and each of the motors 14,16 may have their own control unit in the form of a separate hardware device. Alternatively, the controllers for the engine 12 and the motors 14,16 may be software controllers that reside within one or more hardware controllers, such as a vehicle system controller. In addition, the VSC 46 may communicate with other high level controllers, such as a brake control module (BCM). A BCM can be integrated into the VSC 46, or it may be a separate hardware device.

In order to provide information to the VSC 46 about various vehicle conditions, a number of sensors are used to take measurements and provide information to the VSC 46. A first sensor 48 is in communication with the VSC 46, and is configured to measure a parameter of the engine 12, such as the engine speed. A second sensor 50, also in communication with the VSC 46, is configured to measure a parameter of the first motor 14, such as the motor speed, or the current draw. Similarly, a third sensor 52, also in communication with the VSC 46, is configured to measure a parameter of the second motor 16.

Additional sensors 53, 54,56, similarly communicate with the VSC 46. The sensor 53 is configured to measure the speed of output shaft 57, which allows the speed of the vehicle 10 to be determined. The sensors 54, 56 are configured to measure the speed of the wheels 36; the wheel speed can be used to complement the measurements of the sensor 53 in determining the vehicle speed. Generally, each of the sensors 48,50, 52,53,54,56 is used to measure a vehicle parameter. Of course, the vehicle 10 may be equipped with fewer or more sensors as desired.

In addition to inputs from the various sensors, the VSC 46 also receives input from an accelerator pedal 58. The accelerator pedal 58 responds to driver demands and provides inputs to the VSC 46 to control one or more of the torque producing devices—i.e., the engine 12 or the first or second motors 14,16. The torque of the engine 12 may be controlled by adjusting the angle of a throttle 60, the fueling rate, the spark timing, or some combination thereof. Although the engine 12 shown in FIG. 1 is an internal combustion engine, the engine 12 could be a diesel engine having its torque controlled by controlling the fueling rate and/or injection timing. In addition, as discussed above, the present invention contemplates many different types of vehicles, including fuel cell vehicles. Shown in phantom in FIG. 1 is a fuel cell 62 which can be configured to communicate with the VSC 46 and to provide electric power to the battery 44, or either of the motors 14,16.

The vehicle 10 is configured to use a nonlinear error-based control method in accordance with the present invention. By way of example, the method will be explained in the context of controlling the speed of the vehicle 10 by using a nonlinear speed error function. Of course, the present invention contemplates the use of other nonlinear error-based functions to control a vehicle, such as the vehicle 10. For example, longitudinal motion of a vehicle can be represented equivalently in different physical domains, such as acceleration, torque and force. Therefore, vehicle control can be implemented using a nonlinear control method in any of these domains.

Turning to FIG. 2, a method in accordance with the present invention is illustrated. Initially, the method will be explained in the context of a speed control system, or cruise control system, which may reside within the VSC 46. Alternatively, the cruise control system could be maintained in a separate controller. Block 64 represents a first target value of a first vehicle parameter. In particular, the first vehicle parameter is a vehicle speed, and the first target value is a speed control set point, denoted in FIG. 2 as CC desired speed (v_cc).

A current value of the first vehicle parameter—i.e., the current vehicle speed—is then determined at block 66. The vehicle speed may be determined from inputs from the wheel speed sensors 50,52, which communicate with the VSC 46. The difference between the first target value and the current value is then determined at summing junction 68. This difference is a first error which will be used to control the speed of the vehicle 10.

In order to generate a first vehicle request that is a nonlinear function of the first error, a first gain (Kcc)—see block 70—is applied to the first error at multiplier block 72. The result of this multiplication is a first vehicle request, which is a speed control system desired acceleration, or CC desired acceleration. The CC desired acceleration is a nonlinear error-based function that can be used to control the vehicle 10. Thus, in one embodiment, the present invention merely creates a nonlinear error-based control function through application of a gain to a determined error.

To generate a vehicle request that is a nonlinear error-based function, the gain Kcc is itself a function of the speed error (v_cc−v). One example of such a function is illustrated by the following, where Kcc is a function of a proportional gain ($K_p$) and a variable gain ($K_q$). The variable able gain $K_q$ introduces a nonlinear, quadratic term when it is applied to the determined error. For example, for $K_q = \beta |v\_cc - v|$, the gain Kcc is defined by the following: $Kcc = K_p + \beta |v\_cc - v|$, where Kcc is the first gain, $K_p$ the proportional constant, $\beta$ is a constant, v_cc is the target speed, and v is the determined current speed. Therefore, when the gain Kcc is multiplied by the speed error (v_cc−v), the resulting control function (CC desired acceleration) is a nonlinear function of the speed error.

Figure 3A:
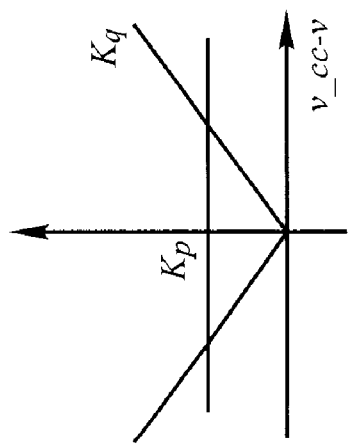
FIGS. 3A-3C are graphs illustrating a gain used in an equation diagrammed in FIG. 2.
Figure 3B:
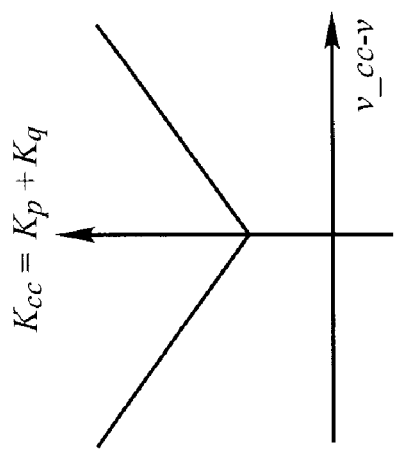
Figure 3C:
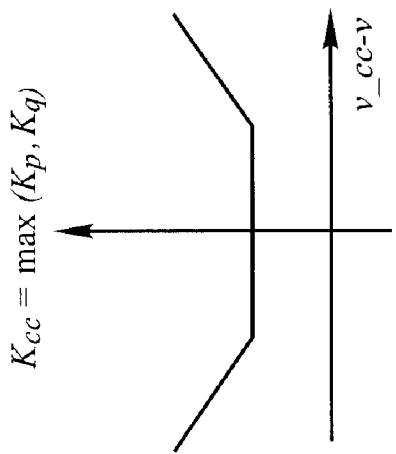

An alternative form of the gain Kcc uses the maximum of the proportional and variable gains, rather than their sum. In particular, the gain Kcc can be defined by the following: Kcc=max ($K_p$, β|v_cc−v|), where max is the maximum of $K_p$ and β|v_cc−v|. The relationships between the proportional and variable gain terms of Kcc are shown in FIGS. 3A-3C. For example, FIG. 3A shows the proportional gain $K_p$ and the variable gain $K_q$ as separate plots on the graphs. Using either of these two gains alone for the value of Kcc has certain drawbacks. For example, the proportional gain $K_p$ remains constant even as the speed error changes. This means that the same gain would be applied to control the vehicle, regardless of the size of the speed error—i.e., regardless of how far the current vehicle speed is from the target speed. This can result in a steady state error that keeps the vehicle from reaching the target speed.

By comparison, the variable gain $K_q$ has an advantage in that it increases as the speed error increases. Thus, control of a vehicle using the variable gain will be more aggressive when the error is larger. Therefore, a control method using this type of gain will reach the target value more quickly than if a proportional gain is used alone. Despite the benefit of using a variable gain such as shown in FIG. 3A, a better value for a gain, such as the gain KCC, can be derived by combining the proportional and variable gains. This is because using the variable gain $K_q$ alone, may compromise the stability of a closed loop system, such as a cruise control system, when the speed error approaches zero.

FIGS. 3B and 3C show alternative methods of combining the proportional and variable gains $K_p$, $K_q$ to get a benefit from each type of gain. It is worth noting that the gains shown in FIGS. 3B and 3C represent only two possibilities for construction of a gain based on an error signal. For example, any positive non-decreasing function of the absolute value of an error can be used to achieve similar results. Thus, the gains shown in FIGS. 3B and 3C have the effect of providing a more aggressive control when the error is large and the vehicle is operating away from its target value, and also provides decreased control action when the vehicle is operating close to its set point. Specifically, the overshoot and oscillations caused by the slow dynamics of throttle angle control can be mitigated by using a nonlinear control function as described above.

Although a method of the present invention can be used to control one aspect of vehicle operation, such as the cruise control, the present invention may also be used to control a number of different vehicle operations, while further employing a nonlinear error-based control method. For example, returning to FIG. 2, a second vehicle request (a_dd), or driver desired acceleration, is determined at block 74. As described above with reference to FIG. 1, such a request will be received as an input into the VSC 46 from the accelerator pedal 58. As described more fully below, the driver desired acceleration is modified at block 76; however, this modification will not affect the result of the ensuing arbitration at block 78. Therefore, the arbitration at block 78 is assumed to take place between the first vehicle request (CC desired acceleration) and the second vehicle request (driver desired acceleration).

The arbitration that takes place at block 78 results in the determination of a first arbitrated vehicle request. Specifically, the maximum of the first and second vehicle request is determined, resulting in the first arbitrated vehicle request.

The first arbitrated vehicle request is itself arbitrated at block 80. The value with which it is arbitrated, is now described.

As discussed above, control of a vehicle may include a vehicle speed limit, which represents an upper limit beyond which it is undesirable to operate the vehicle. The vehicle speed limit is a predetermined value, and may be programmed into a vehicle system controller, such as the VSC 46. Such a speed limit (v_lim) is illustrated in FIG. 2 in block 82. As with the speed control system described above, a method of the present invention can also be applied to the vehicle speed limit, such that a nonlinear error-based vehicle request is generated. Using the nomenclature from above, the vehicle speed limit (v_lim) represents a second target value of the first vehicle parameter (the vehicle speed). As with the CC desired speed above, the vehicle speed limit is combined with the current value of the vehicle speed, which takes place at summing junction 84. This results in a second speed error (v_lim−v).

After the second speed error is determined, a second gain (Klim)—see block 86—is applied to the second speed error at multiplier block 88. This results in a third vehicle request (VSL desired acceleration), which may also be a nonlinear error-based function. The particular form of the VSL desired acceleration depends on the second gain (Klim). For example, Klim may have a form similar to KCC, combining both a proportional term as well as a variable term that is a function of the second speed error (v_lim−v). In fact, the present invention may be applied exclusively to the vehicle speed limit rather than also applying it to the CC desired speed and using an arbitration scheme. There are advantages, however, to applying the present invention to more than one control system on a vehicle, and using an arbitration scheme as illustrated in FIG. 2.

One advantage is that the cruise control and the vehicle speed limit control will both benefit from the nonlinear error-based function generated by application of the present invention. Each of these control functions can then be used to improve the response of an otherwise slow control lever, such as the throttle 60. In addition, by including the arbitration scheme illustrated in FIG. 2, a common problem associated with integral controllers is avoided.

For example, one way to effect vehicle speed limit control is by use of a proportional integral (PI) controller, which regulates the vehicle velocity around the vehicle speed limit. Such a controller includes an explicit integral term in the control equation. The inclusion of an integral term eliminates steady state error. The presence of the explicit integral term, however, makes it necessary to switch in and out of the vehicle speed limit control mode as needed. Each time the control switches to the vehicle speed limit algorithm, the integrator needs to be adjusted to avoid discontinuity in the speed request. As explained below, this problem is eliminated through the use of the present invention, which arbitrates the various vehicle requests prior to the application of an integrator, thereby eliminating the problem of switching in and out of the vehicle speed limit control mode.

Returning to FIG. 2, it is shown that at arbitration block 80, the minimum of the first arbitrated vehicle request and the VSL desired acceleration is determined. This generates a fourth vehicle request, or a first vehicle acceleration request. Next, a current value of a second vehicle parameter—i.e., the vehicle acceleration—is determined a block 90. Finally, a controller, including a transfer function (G), is applied to the vehicle acceleration and the first vehicle acceleration request at block 92, thereby resulting in a fifth vehicle request, or a second vehicle acceleration request. The controller illustrated in block 92 may be a software controller residing in the VSC 46, or some other controller. Alternatively, the controller at block 92 may be a separate hardware device. The specifics of the transfer function G used at block 92 are described below in conjunction with FIG. 4.

Figure 4:
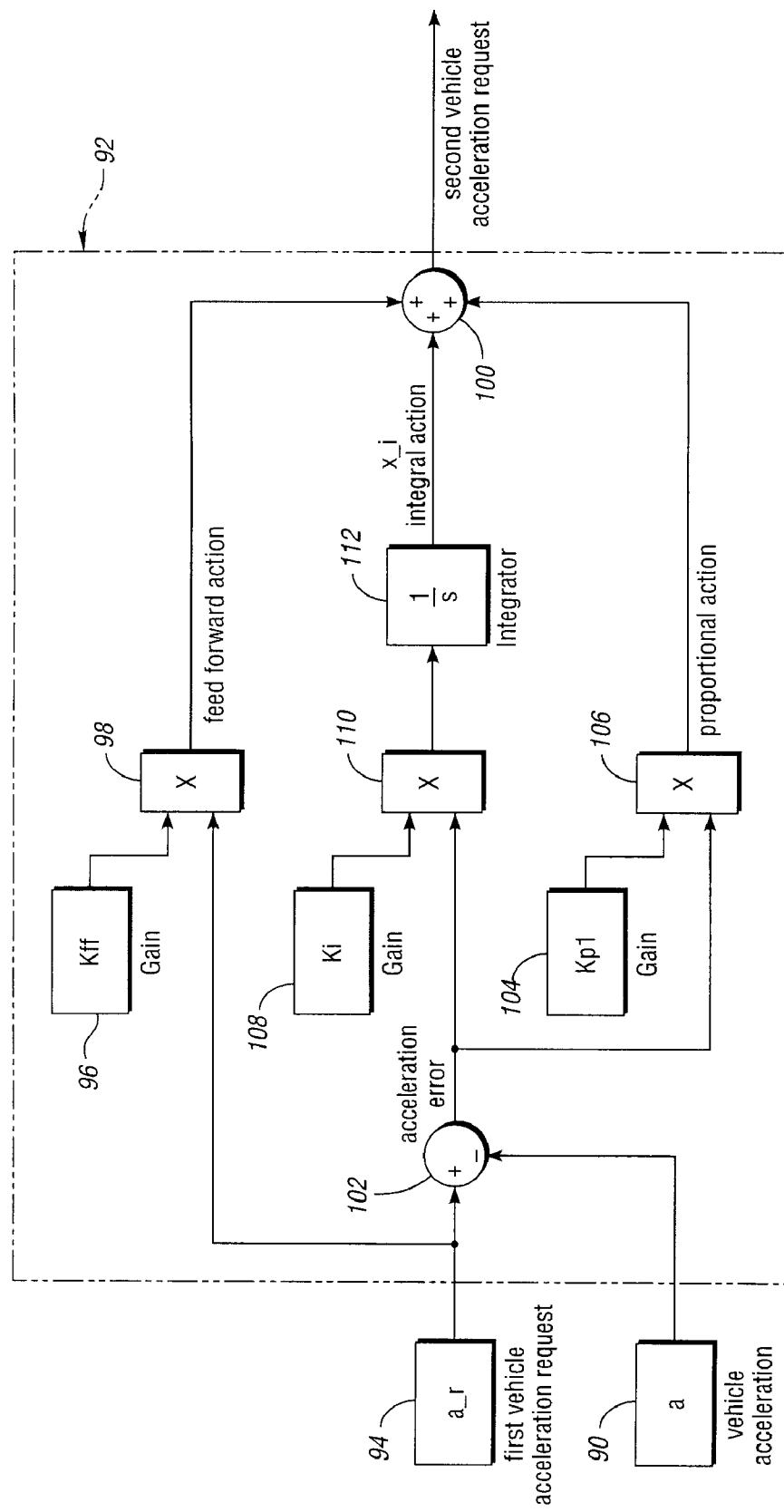
FIG. 4 is a control diagram flowchart illustrating a transfer function used in a method of the present invention.

The transfer function G illustrated in FIG. 4, is only one example of a transfer function that can be used to generate the second vehicle acceleration request. Moreover, as discussed above, a vehicle, such as the vehicle 10, may be controlled using parameters other than acceleration, for example, torque or force. Each of these three domains are related, and therefore, the present invention can be used to control a vehicle using torque or force requests, rather than acceleration requests.

Turning to FIG. 4, it is shown that the transfer function G includes a feed forward action, an integration action, and a proportional action. Specifically, the first vehicle acceleration request, shown at block 94, is used directly in the feed forward action, where a gain (Kff)—see block 96—is applied at multiplier block 98. This value is then fed into a summing junction 100, where it is combined with integration and proportional terms. For the transfer function G illustrated in FIG. 4, the gain Kff can be any value greater than or equal to zero. For the integration and proportional actions within the controller 92, the difference between the first vehicle acceleration request and the measured vehicle acceleration is determined at summing junction 102. This results in a third error, or an acceleration error, as shown in FIG. 4.

The acceleration error is then used in the remaining two actions within the transfer function. Specifically, a gain (Kp1)—see block 104—is applied at multiplier block 106. The resulting value is then combined with the other terms at summing junction 100. As in the case of the gain Kff, the gain Kp1 may also be any value that is greater than or equal to zero.

The acceleration error is also used in the integration action. Specifically, a gain Ki—see block 108—is applied to the acceleration error at multiplier block 110. After application of the gain Ki, the term is then integrated at integrator block 112. The resulting integral action (x_i) is then fed into the summing junction 100, where it is combined with the feed forward term and the proportional term. Unlike the gains Kff and Kp1, the gain Ki is chosen to be a non-zero, positive value. This ensures a continuous updating of the integral term. It should be noted that the integral term also requires antiwindup protection, which is commonly used and applied by those skilled in the art of control systems.

As shown in FIG. 4, the present invention applies an integrator only after each of the various speed controls are arbitrated. This avoids the limitations of other systems discussed above, in which an integrator is only applied to, for example, a vehicle speed limit control. Such a system necessitates switching in and out of the vehicle speed limit control mode, and resetting the vehicle speed limit integrator each time the mode is switched. In contrast, the present invention uses a single integrator for all of the vehicle speed controls, and uses the integrator regardless of which of the vehicle speed controls is the winner of the arbitration. Thus, the integrator is used whether one of the closed loop requests—i.e., the CC desired acceleration or the VSL desired acceleration—wins the arbitration, or whether the driver desired acceleration—an open loop request—wins the arbitration.

Because the driver desired acceleration is an open loop request, it is modified at block 76 prior to the arbitration, so the integrator can still be used. Specifically, block 76 represents a second transfer function which is configured to nullify the effect of the integrator shown in FIG. 4. Thus, block 76 is labeled "Inv G" to denote a transfer function which is, in general, the inverse of the transfer function G shown in FIG. 4. Specifically, when the driver desired acceleration is the winner of the arbitration, and it is desired that the driver desired acceleration pass through the transfer function G unchanged, the proper choice of the gains Kff and Kp1 and the second transfer function InvG can accomplish this. For example, using a transfer function at block 76 that changes the driver desired acceleration from (A_dd) to (A_dd-x_i), and choosing Kff=1 and Kp1=0, allows the driver desired acceleration to pass through the transfer function G unchanged. Therefore, in this situation, the second vehicle acceleration will be equal to the driver desired acceleration.

Although the embodiments described above refer to the control of vehicle speed, and in particular the control of vehicle speed by adjusting the angle of the throttle on an internal combustion engine, the present invention can be used to control a vehicle in different ways. For example, the second vehicle acceleration request shown in FIG. 2, which can be used to adjust the angle of the throttle 60 shown in FIG. 1, could alternatively be a vehicle request to any of the torque producing devices shown in FIG. 1.

For example, if the engine 12 is a diesel engine, the second vehicle acceleration request may be used by the VSC 46 to control the fueling rate of the engine 12. Where the torque producing device is one of the motors 14,16 the second vehicle acceleration request may be used by the VSC 46 to determine an amount of electricity provided to the motors 14,16 by the fuel cell 62. In addition, as discussed above, the present invention may be used to control a vehicle or any vehicle system for which the use of a nonlinear control is desired.

While the best mode for carrying out the invention has been described in detail, those familiar with the art to which this invention relates will recognize various alternative designs and embodiments for practicing the invention as defined by the following claims.

The invention claimed is:

1. A method for controlling a vehicle using a nonlinear error-based control, the method comprising:
   determining a current value of a first vehicle parameter;
   determining a first error, the first error being a difference between a first target value of the first vehicle parameter and the current value of the first vehicle parameter;
   determining a first vehicle request, the first vehicle request being a nonlinear, increasing function of the first error;
   determining at least one additional vehicle request;
   performing at least one arbitration on at least two of the vehicle requests prior to the application of an integrator to any of the at least two vehicle requests, thereby determining an arbitrated vehicle request; and
   applying a first transfer function including an integrator to the arbitrated vehicle request.

2. The method of claim 1, wherein the step of determining at least one additional vehicle request includes determining a second vehicle request, and the step of performing at least one arbitration includes arbitrating the first and second vehicle requests, thereby determining the arbitrated vehicle request.

3. The method of claim 1, wherein the step of determining at least one additional vehicle request includes determining a second vehicle request, determining a second error, the second error being a difference between a second target value of the first vehicle parameter and the current value of the first vehicle parameter, and determining a third vehicle request, the third vehicle request being a nonlinear function of the second error.

4. The method of claim 3, wherein the step of performing at least one arbitration includes arbitrating the first and second vehicle requests to define a result, and arbitrating the result and the third vehicle request, thereby determining fourth the arbitrated vehicle request.

5. The method of claim 4, further comprising determining a current value of a second vehicle parameter and wherein the step of applying a first transfer function includes determining a third error, the third error being a difference between the arbitrated vehicle request and the current value of the second vehicle parameter, the integrator being applied to the third error.

6. The method of claim 5, the vehicle including a speed control system, wherein the first vehicle parameter is a vehicle speed, the first target value of the first vehicle parameter is a set point of the speed control system, the first error is a first speed error, and the first vehicle request is a speed control system desired acceleration.

7. The method of claim 6, wherein the second vehicle request is a driver desired acceleration, and arbitrating the first and second vehicle requests includes determining the larger of the speed control system desired acceleration and the driver desired acceleration.

8. The method of claim 7, wherein the second target value of the first vehicle parameter includes a predetermined vehicle speed limit, and the third vehicle request includes a vehicle speed limit desired acceleration.

9. The method of claim 8, wherein arbitrating the result and the third vehicle request includes determining the lesser of the result and the vehicle speed limit desired acceleration.

10. The method of claim 9, wherein the arbitrated vehicle request includes a first vehicle acceleration request.

11. The method of claim 10, wherein the first transfer function further includes a feedforward action and a proportional action.

12. The method of claim 11, further comprising applying a second transfer function to the driver desired acceleration, the second transfer function being configured to cancel the integration action in the first transfer function when the first vehicle acceleration request is the driver desired acceleration.

13. A method for controlling a vehicle using nonlinear error-based control, the vehicle including a speed control system, the method comprising:
   determining a current value indicative of a vehicle speed;
   determining a first speed error, the first speed error being a difference between a target speed and the current value of the speed; and
   applying a first gain to the first speed error, thereby producing a speed control system desired acceleration for controlling the vehicle, the first gain being defined by the following:
   Kcc=Kp+β|v_cc−v|, where Kcc is the first gain, Kp is a first constant, β is a second constant, v_cc is the target speed, and v is the determined current speed.

14. The method of claim 13, wherein the determined current value is a vehicle speed, the method further comprising:
   determining a second speed error, the second speed error being a difference between a predetermined vehicle speed limit and the vehicle speed;
   applying a second gain to the second speed error, thereby producing a vehicle speed limit desired acceleration, the second gain being a function of the absolute value of the second error;
   determining a driver desired acceleration;
   determining a first arbitrated desired acceleration, the first arbitrated desired acceleration being the larger of the speed control system desired acceleration and the driver desired acceleration; and
   determining a first vehicle acceleration request, the first vehicle acceleration request being the lesser of the vehicle speed limit desired acceleration and the first arbitrated desired acceleration.

15. The method of claim 14, further comprising:
   determining a current value of the vehicle acceleration;
   determining an acceleration error, the acceleration error being a difference between the first vehicle acceleration request and the vehicle acceleration current value; and
   applying a first transfer function to the acceleration error, thereby deriving a second vehicle acceleration request.

16. The method of claim 15, wherein the first transfer function includes a feedforward action, an integration action and a proportional action.

17. The method of claim 16, further comprising applying a second transfer function to the driver desired acceleration, the second transfer function being configured to cancel the integration action in the first transfer function when the first vehicle acceleration request is the driver desired acceleration.

18. A method for controlling a vehicle using nonlinear error-based control, the vehicle including a speed control system, the method comprising:
   determining a current value indicative of a vehicle speed;
   determining a first speed error, the first speed error being a difference between a target speed and the current value of the speed; and
   applying a first gain to the first speed error, thereby producing a speed control system desired acceleration for controlling the vehicle, the first gain being defined by the following:
   Kcc=max (Kp, β|v_cc−v|), where max is the maximum of Kp and |v_cc−v|, Kcc is the first gain, Kp is a first constant, β is a second constant, v_cc is the target speed, and v is the determined current speed.

19. A method for controlling a vehicle using nonlinear error-based control, the vehicle including a speed control system, the method comprising:
   determining a current value of a vehicle speed;
   determining a first speed error, the first speed error being a difference between a target speed and the current value of the speed; and
   applying a first gain to the first speed error, thereby producing a speed control system desired acceleration, the first gain being a non-decreasing function of the absolute value of the first error;
   determining a second speed error, the second speed error being a difference between a predetermined vehicle speed limit and the vehicle speed;
   applying a second gain to the second speed error, thereby producing a vehicle speed limit desired acceleration, the second gain being a function of the absolute value of the second error;
   determining a driver desired acceleration;
   determining a first arbitrated desired acceleration, the first arbitrated desired acceleration being the larger of the speed control system desired acceleration and the driver desired acceleration; and
   determining a first vehicle acceleration request, the first vehicle acceleration request being the lesser of the vehicle speed limit desired acceleration and the first arbitrated desired acceleration.

20. The method of claim 19, further comprising:
   determining a current value of the vehicle acceleration;
   determining an acceleration error, the acceleration error being a difference between the first vehicle acceleration request and the vehicle acceleration current value; and applying a first transfer function to the acceleration error, thereby deriving a second vehicle acceleration request.

21. The method of claim 20, wherein the first transfer function includes a feedforward action, an integration action and a proportional action.

22. The method of claim 21, further comprising applying a second transfer function to the driver desired acceleration, the second transfer function being configured to cancel the integration action in the first transfer function when the first vehicle acceleration request is the driver desired acceleration.

23. A method for controlling a vehicle using nonlinear error-based control, the vehicle including a speed control system, the method comprising:
   determining a current value indicative of a vehicle speed;
   determining a first speed error, the first speed error being a difference between a target speed and the current value of the speed;
   applying a first gain to the first speed error, thereby producing a speed control system desired acceleration, the first gain being defined by one of the following:
   (a) $Kcc = Kp + \beta |v\_cc - v|$, where Kcc is the first gain, Kp is a first constant, $\beta$ is a second constant, v_cc is the target speed, and v is the determined current speed, or
   (b) $Kcc = \max(Kp, \beta |v\_cc - v|)$, where max is the maximum of Kp and $|v\_cc - v|$, Kcc is the first gain, Kp is a first constant, $\beta$ is a second constant, v_cc is the target speed, and v is the determined current speed; and
   using at least the speed control system desired acceleration to control one of: an angle of an engine throttle in the vehicle, an amount of electricity provided to an electric motor in the vehicle, or a fueling rate of a diesel engine in the vehicle.

\* \* \* \* \*

UNITED STATES PATENT AND TRADEMARK OFFICE
CERTIFICATE OF CORRECTION

PATENT NO. : 7,580,786 B2  Page 1 of 1
APPLICATION NO. : 10/708361
DATED : August 25, 2009
INVENTOR(S) : Diana Yanakiev It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1554 days.

Signed and Sealed this

Fourteenth Day of September, 2010

David J. Kappos
*Director of the United States Patent and Trademark Office*